US012573239B2

(12) United States Patent
Patil et al.

(10) Patent No.: US 12,573,239 B2
(45) Date of Patent: Mar. 10, 2026

(54) SYSTEM AND METHOD FOR LIVENESS VERIFICATION

(71) Applicant: Capital One Services, LLC, McLean, VA (US)

(72) Inventors: Swapnil Patil, Vienna, VA (US); Patrick Zearfoss, Leesburg, VA (US); Jason Pribble, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 333 days.

(21) Appl. No.: 17/881,930

(22) Filed: Aug. 5, 2022

(65) Prior Publication Data

US 2024/0046709 A1 Feb. 8, 2024

(51) Int. Cl.
*G06V 40/40* (2022.01)
*G06T 7/50* (2017.01)
*G06V 40/16* (2022.01)

(52) U.S. Cl.
CPC ............... *G06V 40/45* (2022.01); *G06T 7/50* (2017.01); *G06V 40/172* (2022.01); *G06T 2207/10028* (2013.01)

(58) Field of Classification Search
CPC . G06T 2207/10016; G06T 2207/10024; G06T 2207/10028; G06T 2207/20132; G06T 2207/30168; G06T 2207/30176; G06T 7/0002; G06T 7/12; G06T 7/194; G06T 7/50; G06T 7/60; G06T 7/73; G06V 40/161; G06V 40/172; G06V 40/45; H04N 23/61; H04N 23/632; H04N 23/64
See application file for complete search history.

(56) References Cited

U.S. PATENT DOCUMENTS

| | | | |
|---|---|---|---|
| 10,956,714 B2 | 3/2021 | Zhang et al. | |
| 11,030,437 B2 | 6/2021 | Fan et al. | |
| 11,048,953 B2 | 6/2021 | Zou et al. | |
| 2017/0345146 A1* | 11/2017 | Fan ...................... G06V 40/45 |
| 2020/0226237 A1* | 7/2020 | He ....................... G06V 40/166 |
| 2021/0166045 A1 | 6/2021 | Kwak et al. | |
| 2021/0248218 A1 | 8/2021 | Lee et al. | |
| 2021/0264183 A1 | 8/2021 | Wolf et al. | |
| 2022/0309836 A1* | 9/2022 | Gao ...................... G06V 20/64 |

FOREIGN PATENT DOCUMENTS

| | | |
|---|---|---|
| WO | 2021051539 A1 | 3/2021 |
| WO | 2021073364 A1 | 4/2021 |

* cited by examiner

*Primary Examiner* — Ruiping Li
(74) *Attorney, Agent, or Firm* — Sterne, Kessler, Goldstein & Fox P.L.L.C.

(57) ABSTRACT

A method for determining authenticity of an object in real-time is disclosed. The method being performed by a processor includes receiving image data of the object. The image data includes both the captured image showing a visual representation of the object as well as depth data describing the relative distance between different objects in the image and the camera. This depth information is analyzed in order to determine a liveness of the object. The analysis may include verifying a sufficient change in depth between the subject and a background as well as comparing an edge of a foreground object to an expected edge or an edge determined from the image. Based on this analysis, a determination can be made as to whether the image is of a live (e.g., real) subject.

19 Claims, 7 Drawing Sheets

400

500

SYSTEM AND METHOD FOR LIVENESS VERIFICATION

TECHNICAL FIELD

Embodiments of the present disclosure relate to image and/or document analysis, such as verifying the liveness of the subject of an image via user equipment prior to electronic transmission over a network.

BACKGROUND

Computer-based or mobile-based technology allows a user to upload an image or other electronic version of a document for various purposes, for example, a foreign visa application or verifying a user identity for use with a mobile banking app. In many such instances, it is desired to verify that the user is in possession of the document or is present at the device.

BRIEF DESCRIPTION OF THE DRAWINGS/FIGURES

The accompanying drawings are incorporated herein and form a part of the specification.

In the drawings, reference numbers generally indicate identical or similar elements. Additionally, generally, the left-most digit(s) of a reference number identifies the drawing in which the reference number first appears.

DETAILED DESCRIPTION

Figure 1:
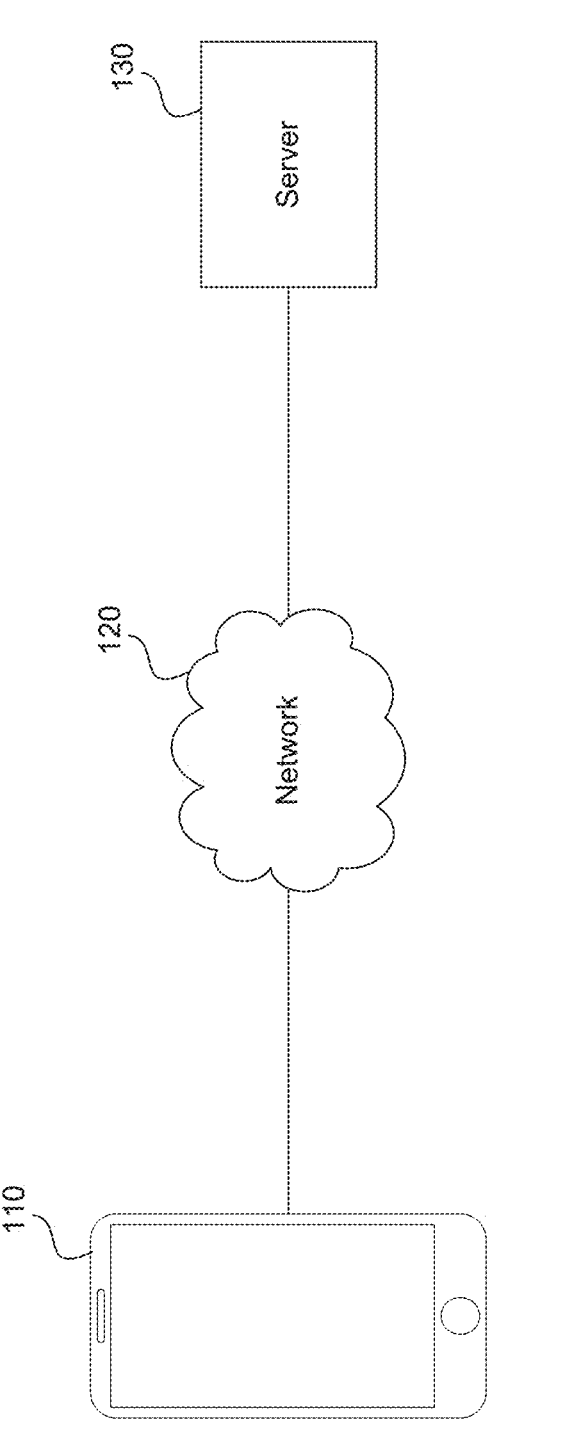
FIG. 1 illustrates an exemplary liveness verification environment according to embodiments.

Provided herein are a method, a system, computer program product embodiments, and/or combinations and sub-combinations thereof for subject liveness verification in real-time on the client-side before capturing images of the subject and uploading them to an application server.

Disclosed embodiments relate to evaluating the "liveness" of an electronically capture image. In other words, computer-based or mobile-based technology allows a user to upload an image or other electronic version of a document for various purposes, for example, a foreign visa application or verifying a user identity for use with a mobile banking app. In many such instances, it is desired to verify that the user is in possession of the document or is present at the device. This "liveness" verification ensures that information is being provided by the purported individual, and not by another, such as a fraudster.

However, a problem currently exists in that this liveness verification can be subverted by taking photographs of those items, rather than presenting the true items. For example, a fraudster may not be in possession of an actual physical document and may instead print a fake copy of a document on paper and attempt to scan that instead. Similarly, a fraudster may not be the verified user of the account, but may be in possession of a picture of the user. If an authentication system cannot differentiate between an image of the live subject and an image of an image, the authenticity of the subject being uploaded cannot be verified. Disclosed herein are technical solutions for prevent this subversion by verifying the liveness of an individual or object, as will be discussed in further detail below.

As discussed above, a fraudster attempting to impersonate a real or imaginary person may need to provide photographic evidence of an identification document, such as a driver's license or passport, or may be asked to provide an image (e.g., a "selfie") of the subject for verification purposes. For example, an image of such an identification document may need to be submitted through a website or user application in order to access a financial account, apply for a foreign visa, apply for a loan, apply for an apartment rental, etc. Certain applications or institutions may instead or additionally request an image of the individual itself. In some embodiments, this is an image of the user's face for facial identification verification. In other embodiments, the image of the face is compared to the image in the identification document to verify that the instant user is the same as the user identified in the document.

In order to circumvent these safeguards, a fraudster may create a counterfeit image, such as a printout or screen image of either the document or the subject image. The fraudster may then attempt to use the counterfeit image by taking a picture of the counterfeit image with a user device, and uploading the resulting image to a server via a corresponding website or application located on the user device. Once the counterfeit image is uploaded to the application server, it is difficult to determine whether the image received at the application server is authentic (e.g., an image of a live user or document). Embodiments of the present disclosure perform real-time authentication of a subject, such as a human face or document, that distinguishes between a legitimate three-dimensional (e.g., live) subject and a two-dimensional (e.g., non-live) subject, such as those printed on a sheet of paper or displayed on a computer screen.

Embodiments of the present disclosure employ one or more cameras capable of determining depth information of objects within a captured image relative to the camera. This depth information may then be used in order to determine whether the image being captured is of a live object or a printed one.

Various embodiments in the present disclosure describe authenticating the image subject in real time when the user takes an image with a user equipment for submission through an application. The user equipment ("UE") may be a user device having a processor and a camera, such as, but not limited to, a mobile telephone, a tablet, a laptop computer, a PDA, or the like. The user may be required to use a specific application downloaded and installed on the user's user equipment, or a particular website. The application or website, when used to take an image of the document, may activate the camera of the user equipment in order to capture the image. The camera provides not only pixel data, but also depth data during capture mode. The app uses this information to determine whether the image is of a live subject.

Based on the subject being imaged, which may be determined automatically (e.g., whether the image is of a person, tax return, passport, driver's license, etc.), the determined depth of the subject being imaged may be compared against a preconfigured value of a depth of the document. For example, the depth of a standard driver's license may be known. If the determined depth of the document sufficiently matches the preconfigured value for the depth of the document, then it may be affirmatively confirmed that the image is of an authentic document. The image data and the determined authentication status may then be sent to the application server. In alternative embodiments, particularly when the subject is a user's face, thresholds instead of predetermined values may be used for determining the subject to be live.

Once the subject is determined to be live, the image is captured for sending to the application server. In embodiments, additional verification and/or authentication steps are taken. In one example, pixel analysis is performed on the captured image in order to determine an "edge" of the subject (e.g., the bounds of the subject within the picture). This pixel edge is compared with a similar edge calculated from the depth data to verify that the edges substantially align. In another example, facial comparison is performed between the subject of the live facial image and the live identification (e.g., license) image to verify that the individuals in the different pictures are the same person.

Various embodiments of these features will now be discussed with respect to the corresponding figures.

FIG. 1 illustrates an exemplary liveness verification environment according to embodiments.

As shown in FIG. 1, a user device 110 may communicate with a server 130 via a network 120. According to embodiments of the present disclosure, the user device 110 may be a personal electronics device includes at least one or more cameras for capturing an image, and may provide the user with a user interface associated with an app or website through which the captured image is being provided. Specifically, the user device 110 may be a desktop personal computer, workstation, laptop, Personal Digital Assistant (PDA), smartphone, smartwatch, wearable device, augmented reality (AR) device, virtual reality (VR) device, and/or computer system 600. Using user device 110, users may interact with an institution's app or website and use a camera of the device to capture an image of a requested subject. An on-board processor may perform certain local processing with respect to the image, such as verifying that the image is of a live subject.

Once an appropriate image has been captured using the user device 110, the user device may transmit the image to the sever 130 over the network 120. Network 140 may include any combination of Local Area Networks (LANs), Wide Area Networks (WANs), and/or the Internet. The server 130 may be an application server associated with the institution requesting the image.

In one non-limiting example, the user may seek access to a banking account or use of certain financial services provided by a bank or financial institution. Using the bank's app installed on the user device 110, the user may be prompted to provide certain image data for user verification purposes. In an embodiment, the user may be requested to provide an image of a live driver's license and a selfie (e.g., a live image of the subject's face). The user may be presented with an image capture interface on a screen of the device, and using the interface and the device's camera, may maneuver the device in order to try to provide an adequate image for capture. During this process, a processor within the device may analyze the image stream in real-time until an acceptable image is detected (described below). Once this occurs, the device may automatically capture the image and transmit the image to the server 130 for further processing. A similar process can be repeated for other images, such as an image of a live license, passport, or other identification document. Other images are also contemplated, such as an image of a current location, an image of a particular landmark, images of informational documents (e.g., loan applications, etc.), and others.

Figure 2C:
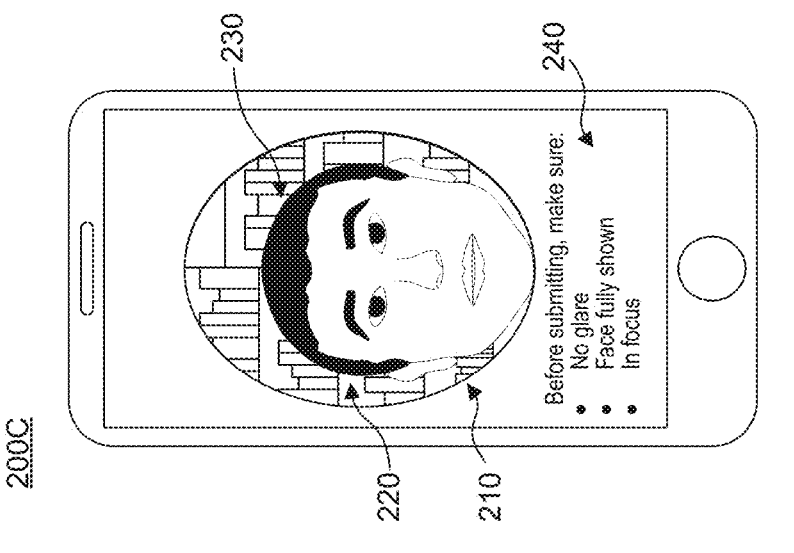
FIG. 2C illustrates an exemplary image capture interface according to various embodiments.
Figure 2B:
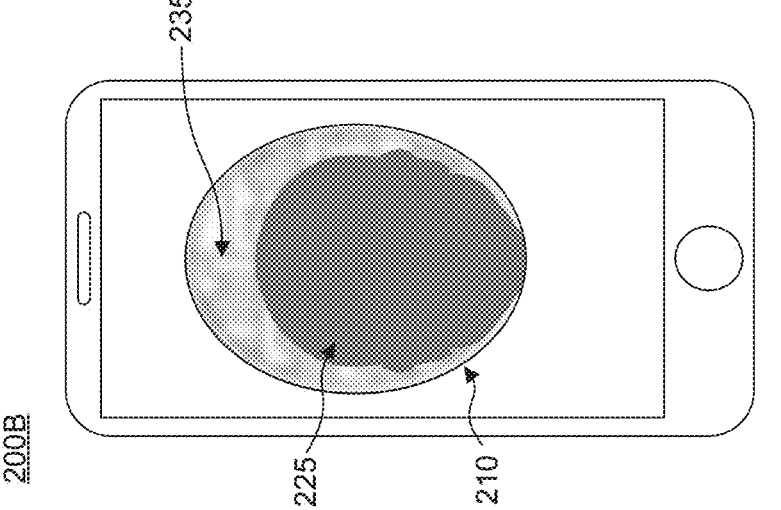
FIG. 2B illustrates an exemplary depth image according to various embodiments.
Figure 2A:
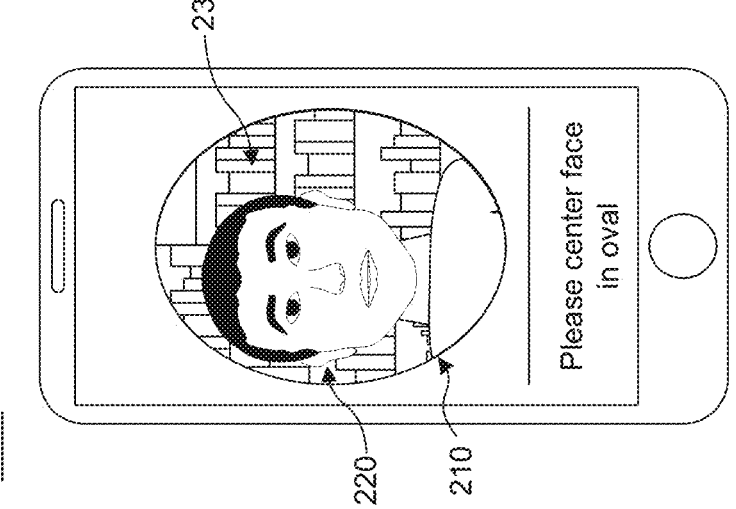
FIG. 2A illustrates an exemplary image capture interface according to various embodiments.

FIG. 2A illustrates an exemplary image capture interface according to various embodiments. As shown in FIG. 2A, at an appropriate time the user device may instruct the user to provide an image of a live object. In the example of FIG. 2A, the live object may be an image of the user's face (e.g., a selfie), but other live objects can also be requested, including but not limited to a driver's license, a passport, a location, or other subject.

Using the interface 200A, the user may be assisted in the process of capturing a suitable image. For example, in the case where the user is prompted to capture an image of his/her face, the user may be provided with instructions via text 240. Initially, the text 240 may provide generic instructions, like "please direct at face," or "please capture selfie." Then, throughout the capture process, the user device may perform a number of image analyses in order to further assist the user with the image capture, as well as to trigger a capture operation. In embodiments, the user device may perform a facial detection algorithm in order to detect a face in view of the camera. Once detected, image analysis may be performed in order to capture a suitable image. This image analysis can include, for example, contrast detection, centering detection, and depth detection among others. These image analyses may be performed on images received from a live image stream provided by the camera.

As shown in FIG. 2A, a capture area 210 may be provided within the user interface 200A. Within that area, the subject 220 and a background 230 may be displayed. Based on the image analysis, the text 240 may change. For example, in response to detecting poor contrast, the text 240 may read "please improve lighting," or "please turn off flash." In response to the image being out of alignment, the text 240 may read "Please center face in oval." Likewise, in response to detecting a lack of depth, the text 240 may read "please use original document," or "please direct at your face."

The aforementioned depth analysis may be performed on depth data included with the image. Specifically, as discussed above, modern device cameras, such as those included within iOS or Android-based devices may not only be capable of determining depth data of an image, but may also make that information readily available. The depth information may refer to the relative distance from each pixel in the image to the camera. FIG. 2B illustrates an exemplary depth image according to various embodiments.

As shown in FIG. 2B, the exemplary depth image may be provided within a user interface 200B inside of the capture area 210, with the level of greyscale corresponding to a detected depth of the image object. In other words, as shown in FIG. 2B, objects detected closer to the camera are identified with dark grey or even black, whereas objects detected as being further from the camera are identified with light grey or white. However, this is for explanation purposes only. In practice, this information generally would not be visible to the user and likely would not be made into an image. Rather, the data would be analyzed by the device in its raw form. As shown in the depth image of FIG. 2B, foreground aspects of the image, such as subject 225 may be significantly closer than background aspects 235 included in the image. In the depth analysis, which may occur in real-time during image submission, the depth contrast of the image may be reviewed. In some embodiments, it may be sufficient that the image includes different regions of different depths that differ by a given threshold. In other embodiments, a determination may be made as to whether there is central foreground object (e.g., an area in the image having low depth) that is approximately in an expected shape (e.g., a document or a human face). The analysis succeeds when these conditions are met and otherwise fails.

FIG. 2C illustrates an exemplary image capture interface 200C according to various embodiments. Once the image analysis process detects that all conditions have been met, the image may be automatically captured. The captured image may be displayed on the user interface 200C. In an embodiment, the image may be displayed in the same manner as it was captured—with both subject 220 and background 230 displayed within the capture area 210. In other embodiments, the captured image may be larger than what was shown as being within the capture area 210, and the full image is displayed. In this final pre-submission phase, according to embodiments, the text 240 now may provide certain verifications to be performed by the user, such as telling the user to verify certain image qualities before submitting. In some embodiments, the text 240 may merely tell the user to submit the image if satisfied, and in other embodiments still, this final step may be skipped altogether and the capture image is automatically transmitted to the server.

Figures 3A, 3B:
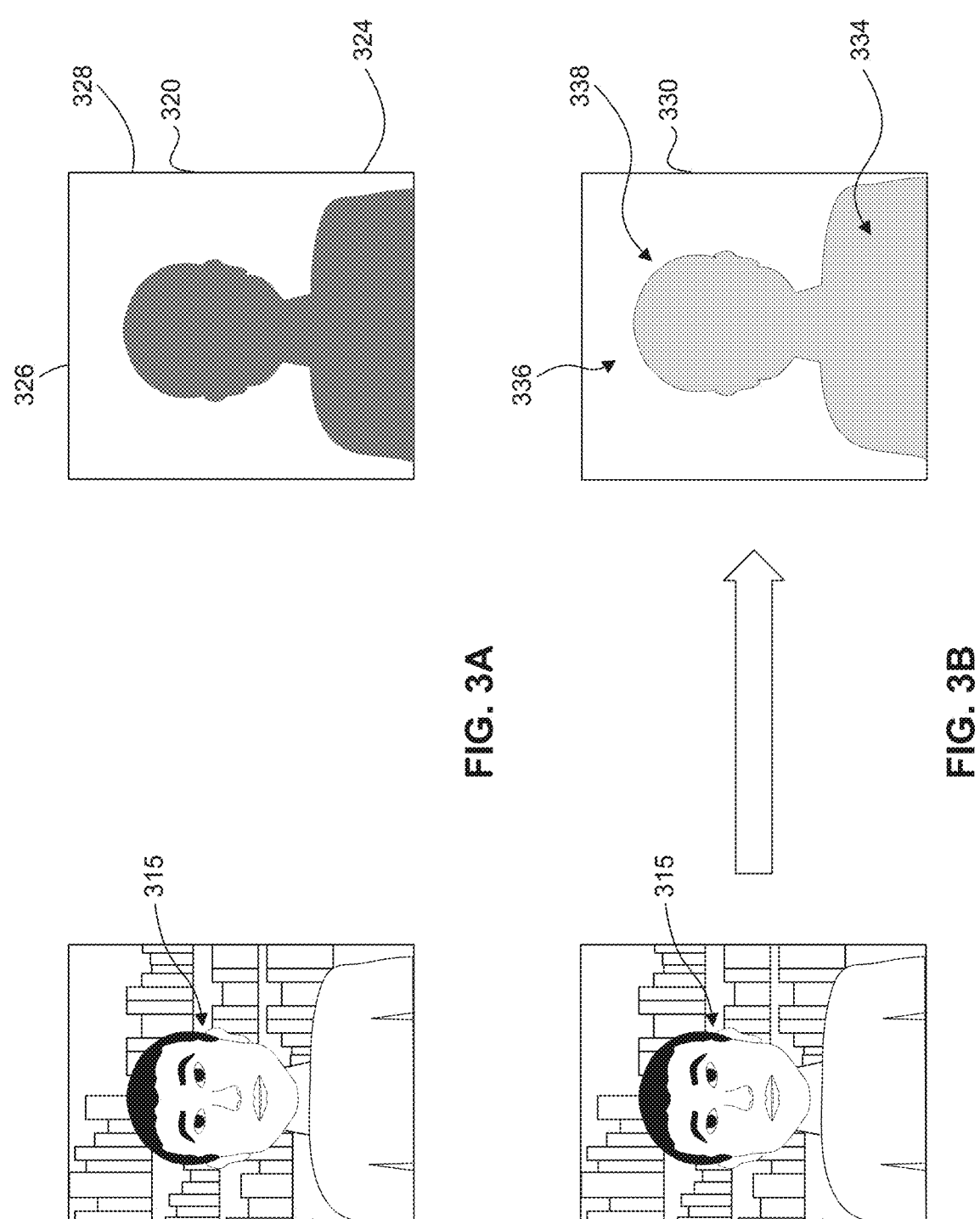
FIG. 3A illustrates an exemplary depth edge detection according to embodiments.
FIG. 3B illustrates an exemplary pixel edge detection according to embodiments.
Figure 3C:
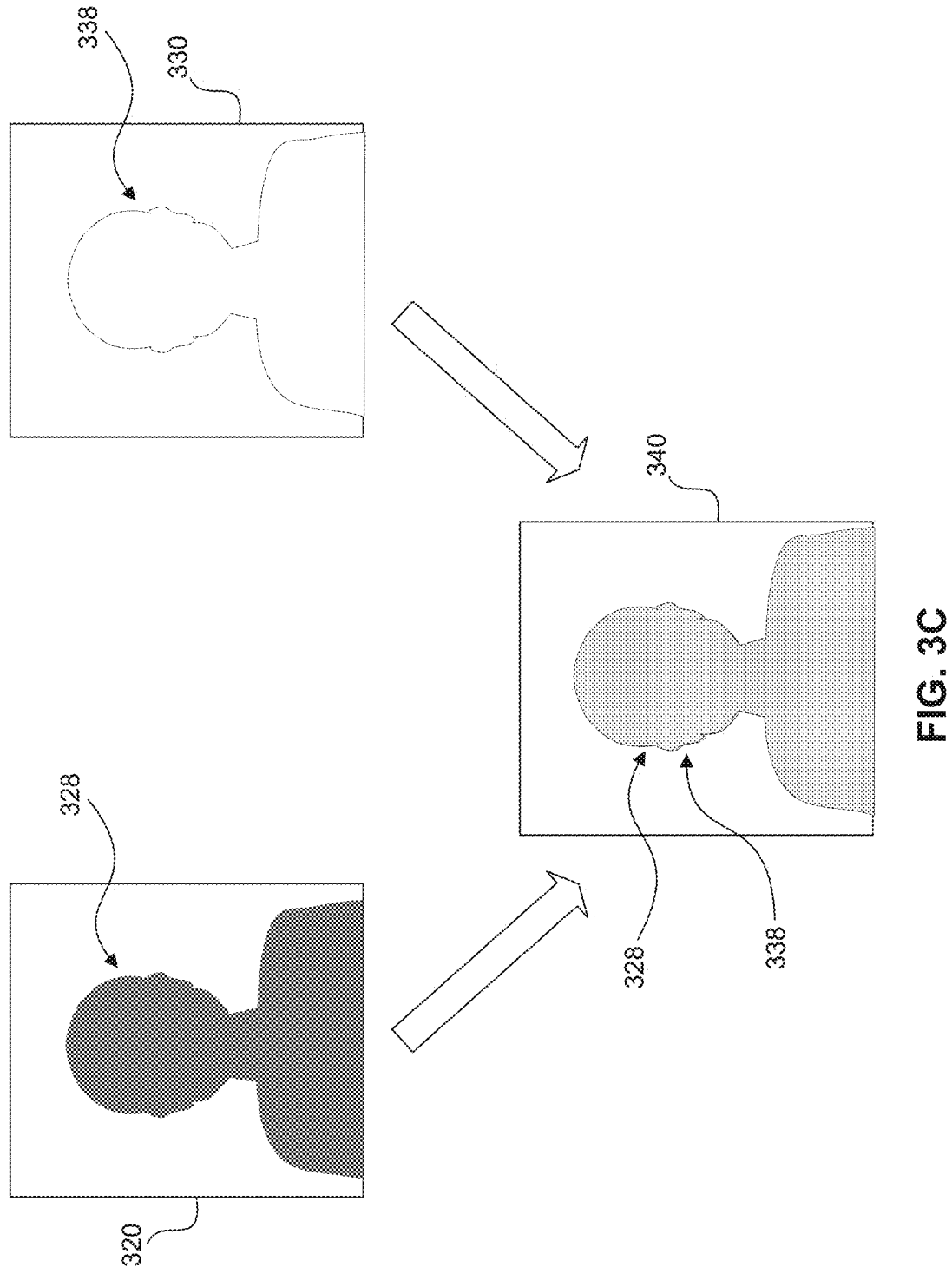
FIG. 3C illustrates an exemplary edge comparison according to embodiments.

Once the image is received at the server, additional backend processes may take place, as shown for example in FIGS. 3A-3C. One such process, according to some embodiments, may be an edge comparison. FIG. 3A illustrates an exemplary depth edge detection according to embodiments. As discussed above, the image depth data provided by the camera can be processed to distinguish between a subject (e.g., a foreground object) and the background based on their comparative depths. For example, a foreground object will typically have a lower depth (e.g., distance from the camera) than the background. By processing this data, a determination can be made as to where the depth data abruptly shifts from near (object) to far (background). Based on this, an edge of the foreground object can be identified, as shown in FIG. 3A.

Specifically, as shown in FIG. 3A, an image 310 may be analyzed. The image may include a foreground object 315 and a background 318. The image may have corresponding depth data, as shown in depth image 320. As shown, the background depth 326 may be much larger than the foreground depth 324. Additionally, there may be an area of the depth image 320 that shares approximately the same foreground depth 324. This area may be identified as the object of the depth image 320. Further, the point at which the depth changes to a predetermined degree from foreground to background may be considered the object edge or depth edge 328.

As shown in FIG. 3B a similar analysis can be performed using the pixel data of the original image 310. FIG. 3B illustrates an exemplary pixel edge detection according to embodiments. Once again, the image 310 may include a subject 315 and a background 318. Using pixel analysis, the edge of the subject can be determined. According to embodiments, this can be based on changes in pixel hue, color, or contrast or using other pixel analysis methods. As shown in analyzed image 330, area 336 may be identified as background, area 334 may be identified as foreground, and the subject edge or pixel edge may be determined to be line 338 as the boundary between those two areas. Once the pixel edge and the depth edge have been determined, they can be compared to determine congruency between the images.

FIG. 3C illustrates an exemplary edge comparison according to embodiments. As shown in FIG. 3C, the depth image 320 may include the depth edge 328 and the pixel image 330 includes pixel edge 338. These edges and/or areas are compared to each other in order to determine congruency as shown in combined image 340. If the combined image 340 shows high congruency (e.g., alignment) between the pixel edge and the depth edge, then the image may be determined to be live and authentic. In this case, the image is accepted. On the other hand, if there is low congruency between the pixel edge and the depth edge, then the image may be determined to be anomalous, and it is rejected. According to embodiments, remedial actions may include denying access to the user until a new image is provided, notifying the user of the error, providing the image for managerial review, etc.

In certain embodiments, the image capture and depth analysis can be performed for multiple different images, such as for both a live image of the user's face and a live image of the user's picture identification. According to some embodiments, subject analysis may be performed on the two different images to verify an identity of the user. For example, facial analysis is performed on both the selfie image and the identification in order to verify that they are of the same individual.

Figure 4:
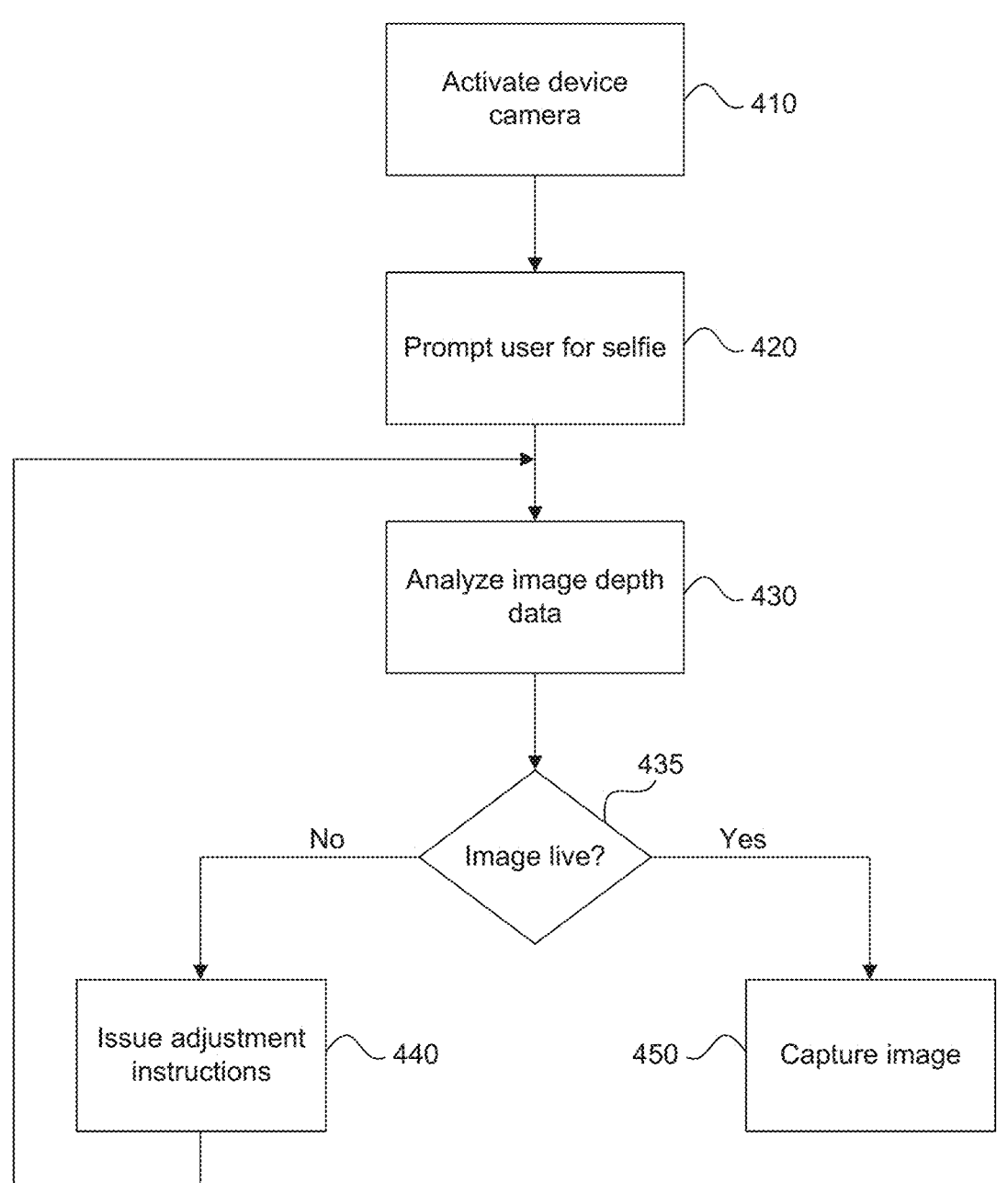
FIG. 4 illustrates a flowchart of an exemplary method for image liveness detection, according to embodiments.

As described above, using the depth data available from modern cameras, a liveness of the subject can be verified. This can be used for a variety of different FIG. 4 illustrates a flowchart of an exemplary method 400 for image liveness detection, according to embodiments. In the embodiment of FIG. 4, the user is requested to provide a selfie. However, this process can be applied to other subjects as well, such as an identification document. As shown in FIG. 4, the imaging process begins by activating the device camera(s) 410. For example, one or more of the device's cameras can be powered on, and the user interface of the device can be changed to show the image within the field of view of the one or more cameras that will ultimately be captured.

In step 420, the user interface prompts the user for a selfie. In embodiments, this may be performed by a visual cue, such as an on-screen message to the user. However, in other embodiments, an audible or other cue can be used in order to request that the user capture the image. In an embodiment, the user may be provided with instructions via text, such as "please direct at face," or "please capture selfie."

In step 430, while the user is positioning the device, the user device may begin receiving a stream of images via the activated camera(s). For each image, the user device may analyze image depth data associated with the image. As discussed above, in various embodiments, this can be performed by identifying a type of the object being imaged, and then using the depth data to determine whether an outline a foreground object substantially aligns with an outline of the object being imaged. According to embodiments, the analysis can also include comparing a shape of the foreground to a predetermined expected shape of the object.

In step 435, based on the analysis of step 430, the user device may determine whether the image is of a live subject. As described above, this determination can be based on the relative alignment (e.g., correlation) between the depth data and the object outline, and may involve comparing this correlation to one or more predefined values or thresholds. In embodiments, this analysis may involve identifying, based on the depth data, a foreground and a background of the image and comparing a detected object to the detected foreground. In other analyses, pixel edge detection may be performed based on changes in pixel hue, color, or contrast, and the detected pixel edge may be compared to the detected foreground and/or background of the image.

If the image is determined to include a live subject (435—Yes), then the image is captured in step 450. The captured image is provided to the user for verification and submission, and the camera is disabled. In embodiments, the capturing of the image involves capturing not only the light image, but also a depth image indicating the depth information.

Alternatively, if the image is determined to not include a live subject (435—No), then adjustment instructions may be issued to the user 440. In this embodiment, adjustment instructions may instruct the user to "point the camera at your face" or "please capture a live image." Then, the image analysis repeats for the next image in the image stream, returning to step 430.

Figure 5:
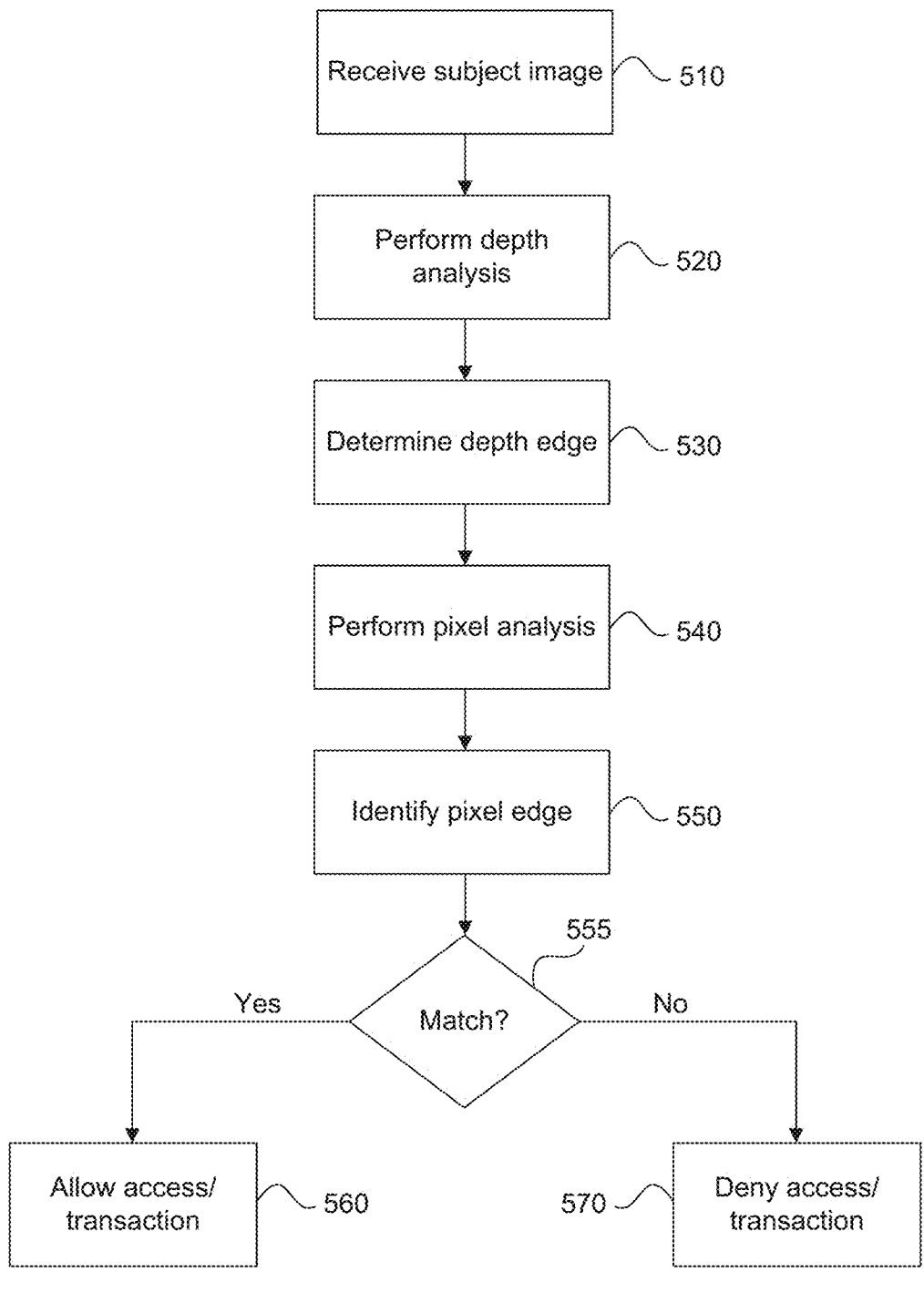
FIG. 5 illustrates a flowchart of an exemplary method for liveness-based authentication according to embodiments.

FIG. 5 illustrates a flowchart of an exemplary method for liveness-based authentication according to embodiments. As shown in FIG. 5, the method begins by receiving the subject image in step 510. In embodiments, the image is received by a backend server that will carry out the analysis. In embodiments, the image may be accompanied by or otherwise include the depth data corresponding to the captured image.

In step 520, the server then performs depth analysis of the received image. In embodiments, this analysis is performed to determine whether a subject of the image has a depth associated therewith. In embodiments, this analysis may involve identifying, based on the depth data, a foreground and a background of the image and comparing a detected object to the detected foreground. In other analyses, pixel edge detection may be performed based on changes in pixel hue, color, or contrast, and the detected pixel edge may be compared to the detected foreground and/or background of the image. This analysis may include several additional components, as described below.

For example, in step 530, the server identifies a depth edge of the subject included in the image. As discussed above, the depth edge identifies an edge of the subject based on the depth data. In other words, an edge of a foreground object may be identified as the line at which the depth changes from shallow to deep, and can be based on one or more of a threshold or a predefined value.

In step 540, the server also performs a pixel analysis of the received image. In embodiments, the pixel analysis looks at color and congruency between adjacent pixels as well as known pixel patterns in order to identify a subject of the image. In embodiments, the pixel analysis can include edge identification. In embodiments, the pixel analysis may be performed based on changes in pixel hue, color, or contrast.

In step 550, the server identifies a pixel edge of the received image. As discussed above, this can be performed based on a difference in various image qualities, such as contrast, hue, etc. As a result of this determination, a predicted edge of the object within the image may be determined. In embodiments, this determination may be based on comparing the pixel differences to one or more threshold values. For example, a difference that exceeds the threshold may be determined to be an object edge, whereas a difference that falls below that threshold may be determined not to be such an edge.

In step 555, once the pixel edge has been determined, the pixel edge and the depth edge are compared to determine whether they match (e.g., the degree to which they are aligned). If they are determined to match (e.g., substantially align, 550—Yes), then the user is verified and the access/transaction is allowed as shown in step 560. On the other hand, if they are determined not to match (555—No), then the user's verification fails and the access/transaction is denied as shown in step 570.

Figure 6:
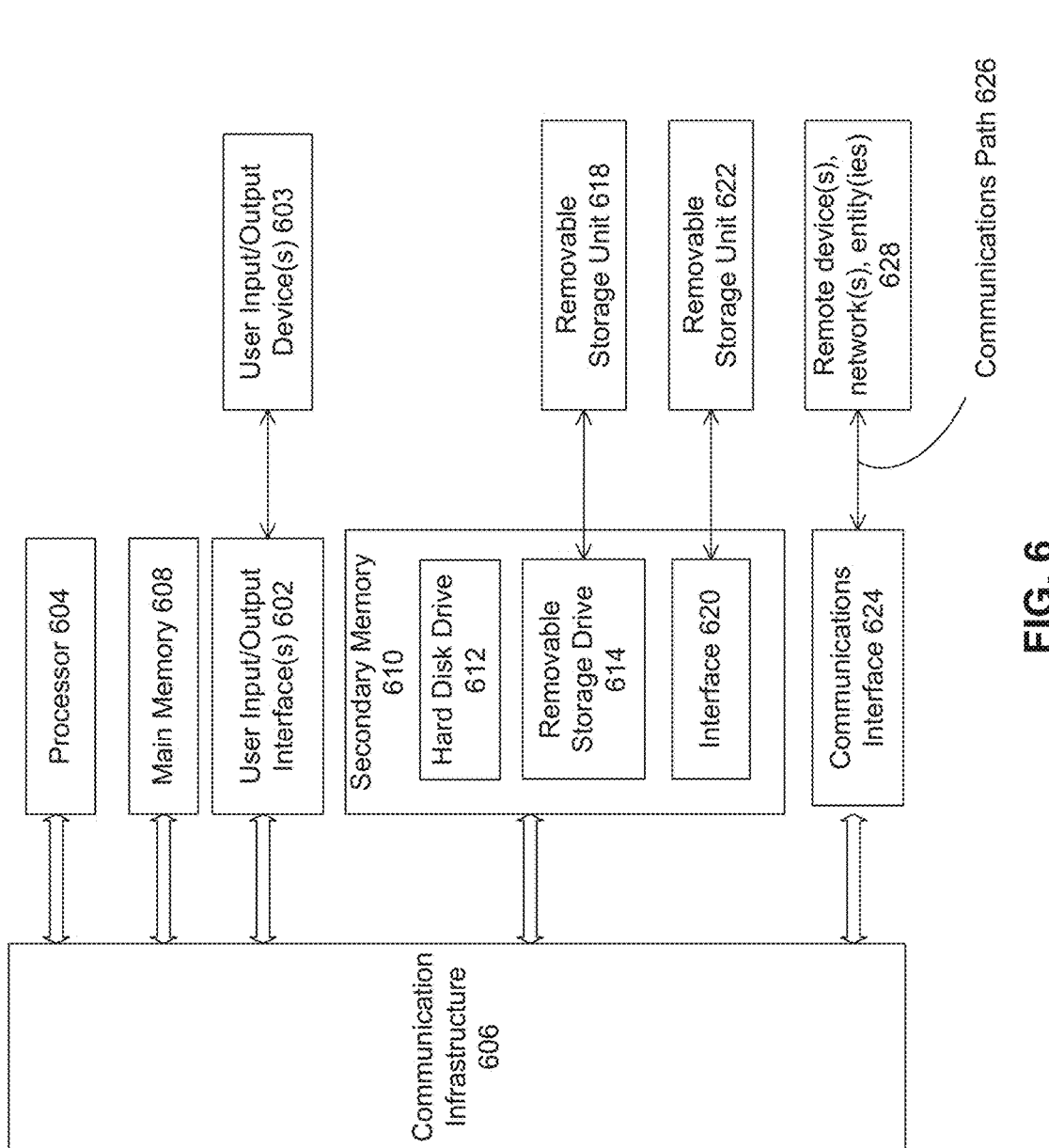
FIG. 6 illustrates an example computer system for implementing some aspects of the disclosure or portion(s) thereof.

Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method for user verification in a computing device, comprising:

activating a camera associated with the computing device in response to receiving a request for user verification;

prompting the user to provide an image of the user's face using the camera;

receiving at least one video frame from a video feed, the video frame including depth data for pixels across the video frame;

analyzing the depth data associated with the video frame to distinguish a subject in a foreground from a background;

performing a preliminary liveness verification on the video frame, the preliminary liveness verification comprising determining that the video frame includes a live image of the subject based on the analyzing, the preliminary liveness verification including determining that a depth of the subject in the foreground differs from a depth of the background by a predetermined threshold, and including determining that there is a first region of the video frame having a first depth that is similar in shape to an expected shape of the subject;

capturing the image that includes the subject from the video frame in response to the preliminary liveness verification;

performing edge detection analysis on the depth data to detect a depth edge associated with a foreground object corresponding to the subject;

performing edge detection analysis on the captured image to detect an image edge associated with the subject; and performing a subsequent liveness verification of the captured image based on a comparison of the depth edge to the image edge.

2. The method of claim 1, wherein a second region of the video frame has a second depth that differs from the first depth of the first region.

3. The method of claim 1, further comprising:

prior to the verifying:

determining that the video frame does not include a live subject based on the analyzing; and prompting the user to take a photo of a live subject in response to the determining.

4. The method of claim 3, wherein the determining determines that there is no region of the video frame that has a depth similarity that corresponds to a shape of a face.

5. The method of claim 1, further comprising:

prompting the user to provide an image of a printed face on a photographic identification document; and comparing a captured face within the captured image to the printed face.

6. The method of claim 5, further comprising:

permitting access to a secure system in response to the captured face substantially matching the printed face; and denying access to the secure system in response to the captured face not substantially matching the printed face.

7. A computing device for providing access to a secure system, the computing device comprising:

an image capture device;

a communication interface configured to communicate with a server; and a user interface configured to interface with a backend server and controlled by one or more processors configured to perform operations comprising:

receiving an access request from a user;

prompting the user, in response to the access request, to provide a live image of a face of the user;

receiving at least one video frame of a video feed from the user, the at least one video frame including depth information for pixels across the at least one video frame;

performing a preliminary liveness verification on the at least one video frame, the preliminary liveness verification comprising determining, based on the depth information, that the at least one video frame includes a live image of a face, the preliminary liveness verification including verifying that a depth of an object in the at least one video frame differs from a depth of a background by a predetermined threshold, and verifying that there is a first region of the at least one video frame having a first depth that is similar in shape to a shape of a face;

capturing a video frame from among the at least one video frame as the live image in response to the preliminary liveness verification;

performing edge detection analysis on the depth information to detect a depth edge associated with a foreground object corresponding to the face of the user;

performing edge detection analysis on the captured video frame to detect an image edge associated with the face of the user; and performing a subsequent liveness verification of the captured video frame based on a comparison of the depth edge to the image edge.

8. The computing device of claim 7, wherein the determining includes identifying a first region of the at least one video frame that has a substantially similar depth compared to a second region of the at least one video frame.

9. The computing device of claim 7, wherein the one or more processors is further configured to prompt the user to provide a live image of a printed face on a photographic identification document.

10. The computing device of claim 9, wherein the one or more processors is further configured to:

perform facial analysis of each of the printed face and the live face; and compare the printed face to the live face.

11. The computing device of claim 10, wherein the one or more processors is further configured to:

grant the access request in response to the printed face substantially matching the live face; and deny the access request in response to the printed face not substantially matching the live face.

12. A method for verifying a user, comprising:

receiving an access request from the user;

prompting, in response to the access request, the user to provide a live image of the user's face;

receiving a video frame of a video feed from the user via an image capture device, the video frame including depth information for pixels across the video frame;

performing a preliminary liveness verification on the video frame, the preliminary liveness verification including first determining, based on the depth information, that the video frame is a live image and second determining, based on a pixel analysis of the video frame, that the video frame includes a face, the second determining including verifying that a depth of an object in the video frame differs from a depth of a background by a predetermined threshold, and including verifying that there is a first region of the video frame having a first depth that is similar in shape to a shape of a face;

capturing the video frame as the live image in response to the preliminary liveness verification;

performing edge detection on the depth information to detect a depth edge associated with a foreground object corresponding to the user's face;

performing edge detection analysis on the captured video frame to detect an image edge associated with the user's face; and performing a subsequent liveness verification of the captured video frame based on a comparison of the depth edge to the image edge.

13. The method of claim 12, further comprising activating the image capture device associated with a user device, wherein the image capture device is capable of detecting depth data.

14. The method of claim 12, wherein the first determining includes:

identifying the first region of the depth information that has substantially similar depths.

15. The method of claim 12, further comprising:

prior to the first determining:

third determining, based on the depth information, that the video frame is not a live image; and prompting the user to provide a live image.

16. The method of claim 15, wherein the third determining includes failing to identify any region of the depth information that has substantially similar depth and has a shape corresponding to a human face.

17. The method of claim 12, further comprising granting the access request based on the capturing.

18. The method of claim 1, wherein the edge detection analysis detects the depth edge by identifying a change in depth within the depth data that exceeds the predetermined threshold.

19. The method of claim 1, wherein the edge detection analysis detects the image edge by analyzing pixels within the captured image for changes in hue, color, or contrast with adjacent or nearby pixels within the captured image.

\* \* \* \* \*